(12) United States Patent
Downes et al.

(10) Patent No.: US 8,713,117 B2
(45) Date of Patent: Apr. 29, 2014

(54) SYSTEMS AND METHODS FOR PERFORMING LIVE CHAT FUNCTIONALITY VIA A MOBILE DEVICE

(75) Inventors: Scott Downes, Atlanta, GA (US); Paul E. Griswold, Lawrenceville, GA (US); Jennifer D. Raccuglia, Norcross, GA (US); Harvey M. Scholl, Atlanta, GA (US)

(73) Assignee: Air2Web, Inc., Atlanta, GA (US)

( * ) Notice: Subject to any disclaimer, the term of this patent is extended or adjusted under 35 U.S.C. 154(b) by 65 days.

(21) Appl. No.: 13/475,530

(22) Filed: May 18, 2012

(65) Prior Publication Data

US 2013/0060871 A1 Mar. 7, 2013

Related U.S. Application Data

(60) Provisional application No. 61/487,456, filed on May 18, 2011.

(51) Int. Cl.
*G06F 15/16* (2006.01)
(52) U.S. Cl.
USPC ........... 709/206; 709/204; 709/217; 709/230; 709/202; 709/227; 709/238; 709/250; 709/219; 709/246
(58) Field of Classification Search
USPC .................. 709/206, 204, 217, 219, 230, 202
See application file for complete search history.

(56) References Cited

U.S. PATENT DOCUMENTS

| 2003/0182391 | A1* | 9/2003 | Leber et al. | 709/217 |
|---|---|---|---|---|
| 2004/0249899 | A1* | 12/2004 | Shiigi | 709/206 |
| 2006/0150119 | A1* | 7/2006 | Chesnais et al. | 715/810 |
| 2006/0173959 | A1* | 8/2006 | McKelvie et al. | 709/204 |
| 2008/0114835 | A1* | 5/2008 | Mu et al. | 709/204 |

\* cited by examiner

*Primary Examiner* — Jude Jean Gilles
(74) *Attorney, Agent, or Firm* — Morris, Manning & Martin, LLP; Daniel E. Sineway, Esq.

(57) ABSTRACT

Aspects of the present disclosure generally relate to systems and methods for extending chat capabilities of traditional computer-to-computer chat systems to mobile devices. As will be generally understood, chat sessions typically allow users and chat agents to type and send/receive messages through a chat system. According to one aspect, such a mobile consumer messaging system (MCMS) utilizes existing mobile communication channels to interface with existing traditional chat systems. Specifically, in various embodiments of the MCMS, chat agents using existing, traditional chat systems are able to participate in chat sessions with end users through the users' mobile devices without specific modifications to the existing chat system. Further, according to one embodiment, chat agents utilize a single chat platform to participate in chat sessions with end users through the end users' mobile devices as well as with various other users utilizing a traditional chat system on a computer.

25 Claims, 12 Drawing Sheets

EXEMPLARY MOBILE CONSUMER MESSAGING SYSTEM ("MCMS") ARCHITECTURE

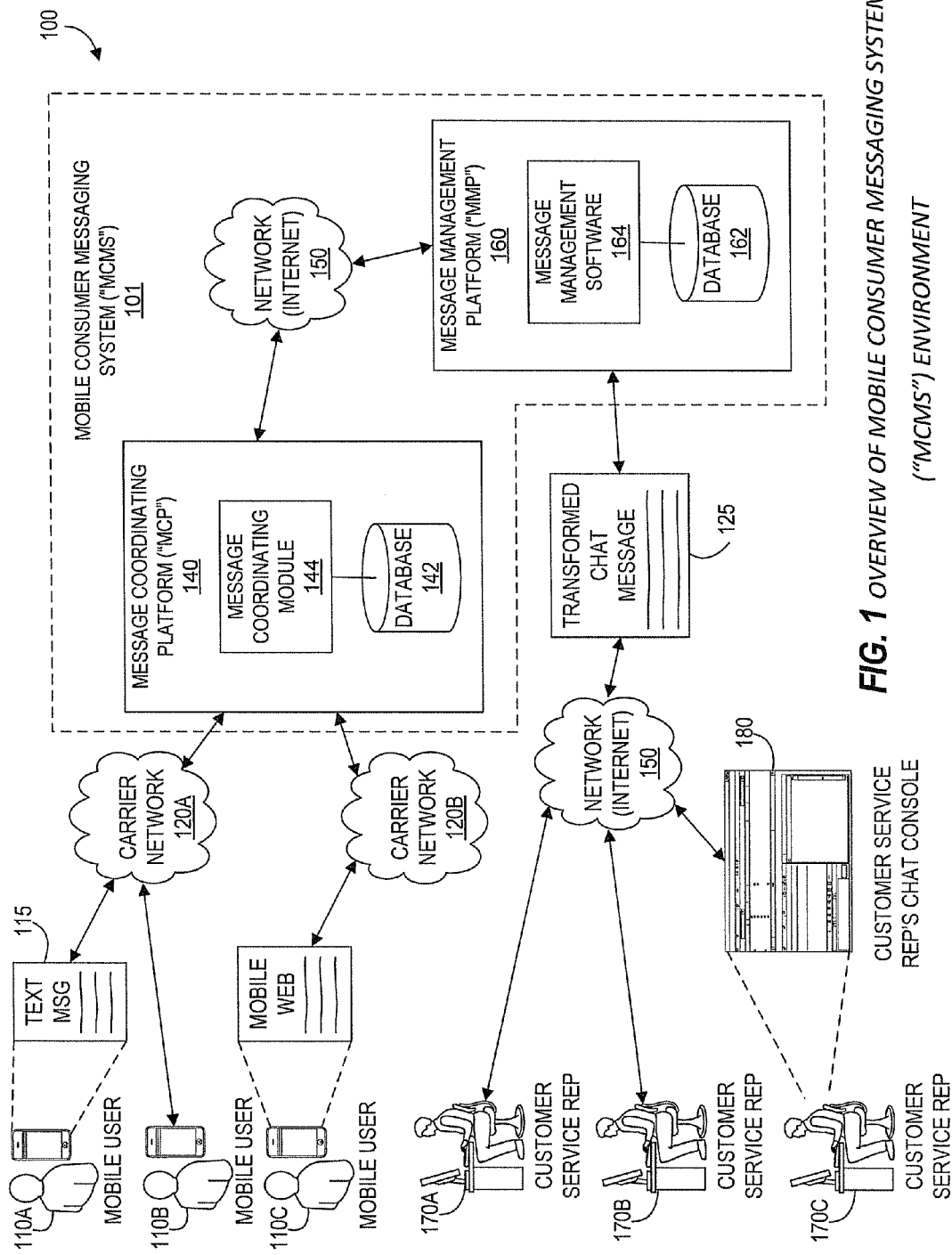
FIG. 1 OVERVIEW OF MOBILE CONSUMER MESSAGING SYSTEM ("MCMS") ENVIRONMENT

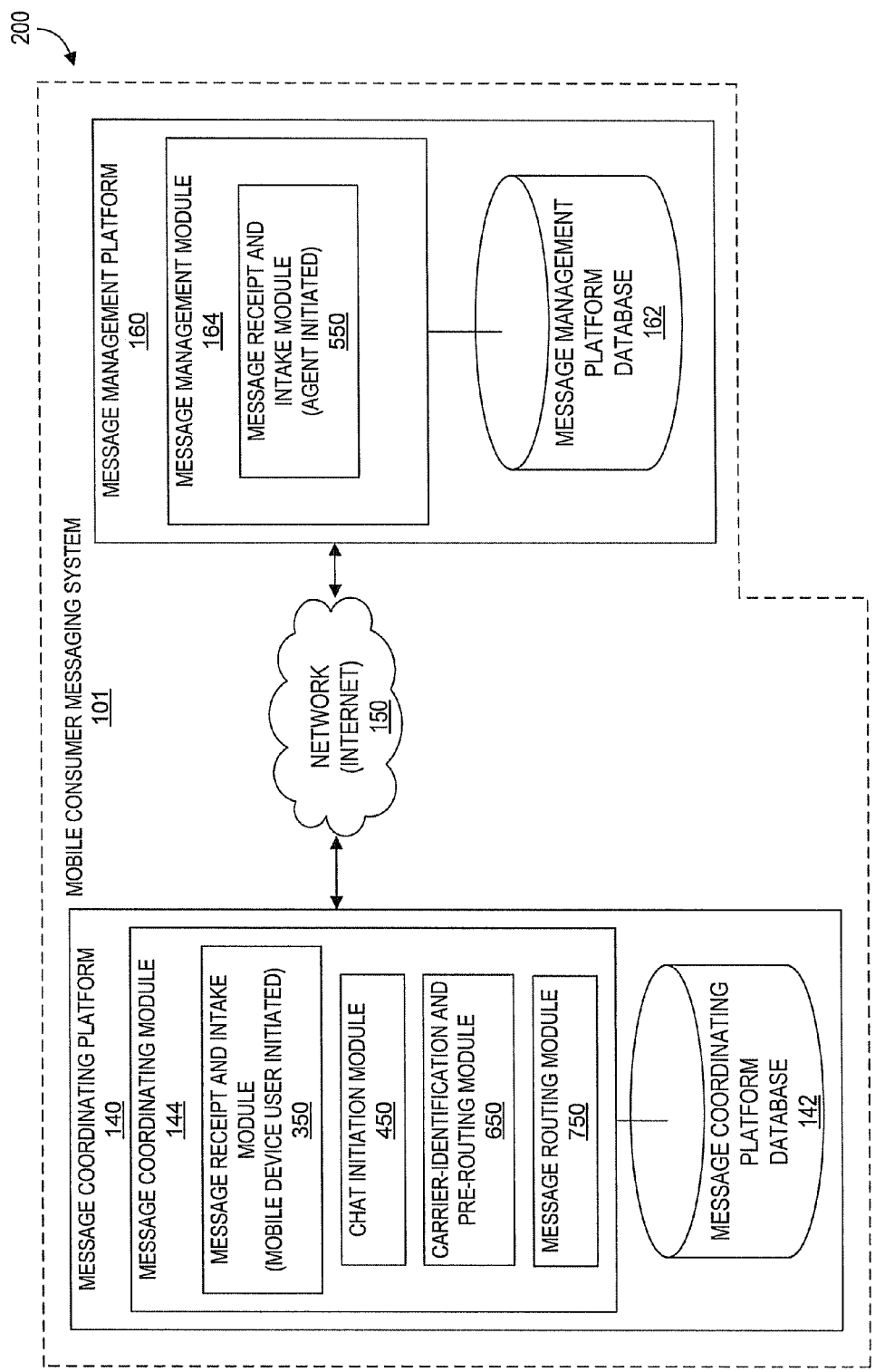
FIG. 2 EXEMPLARY MOBILE CONSUMER MESSAGING SYSTEM ("MCMS") ARCHITECTURE

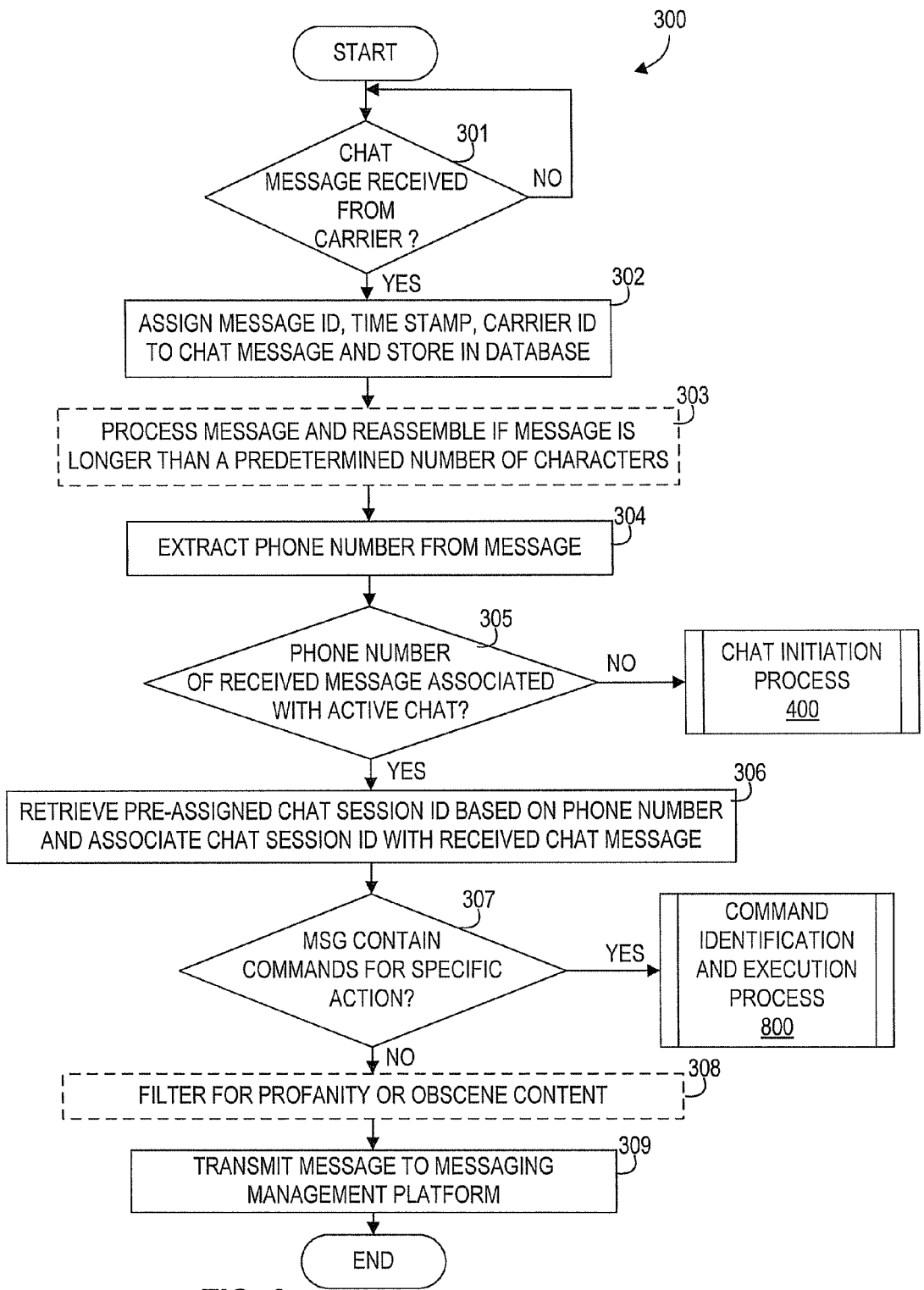
FIG. 3 *MESSAGE RECEIPT AND INTAKE PROCESS*
*(MOBILE DEVICE USER INITIATED)*

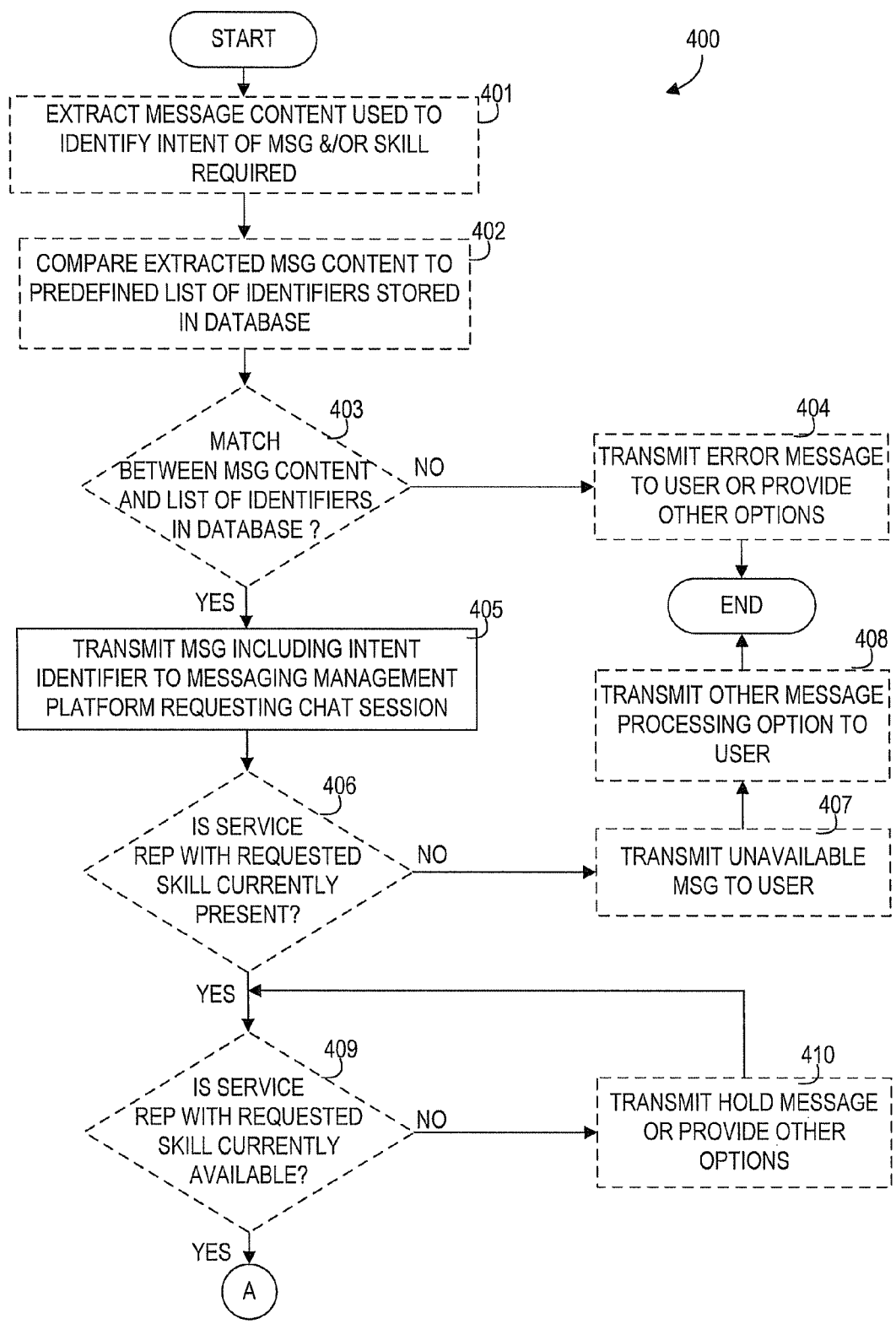
FIG. 4A *CHAT INITIATION PROCESS*

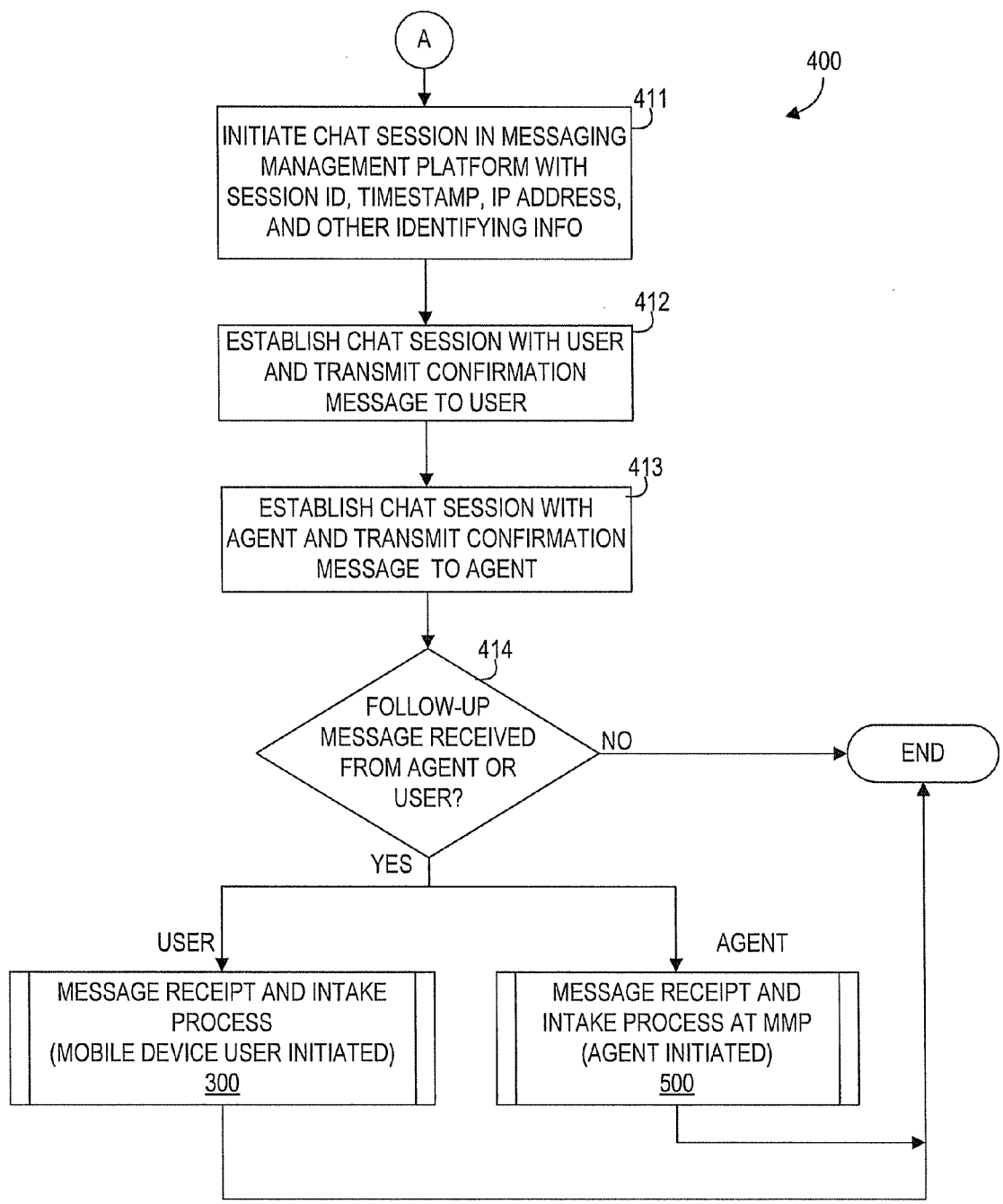
FIG. 4B CHAT INITIATION PROCESS

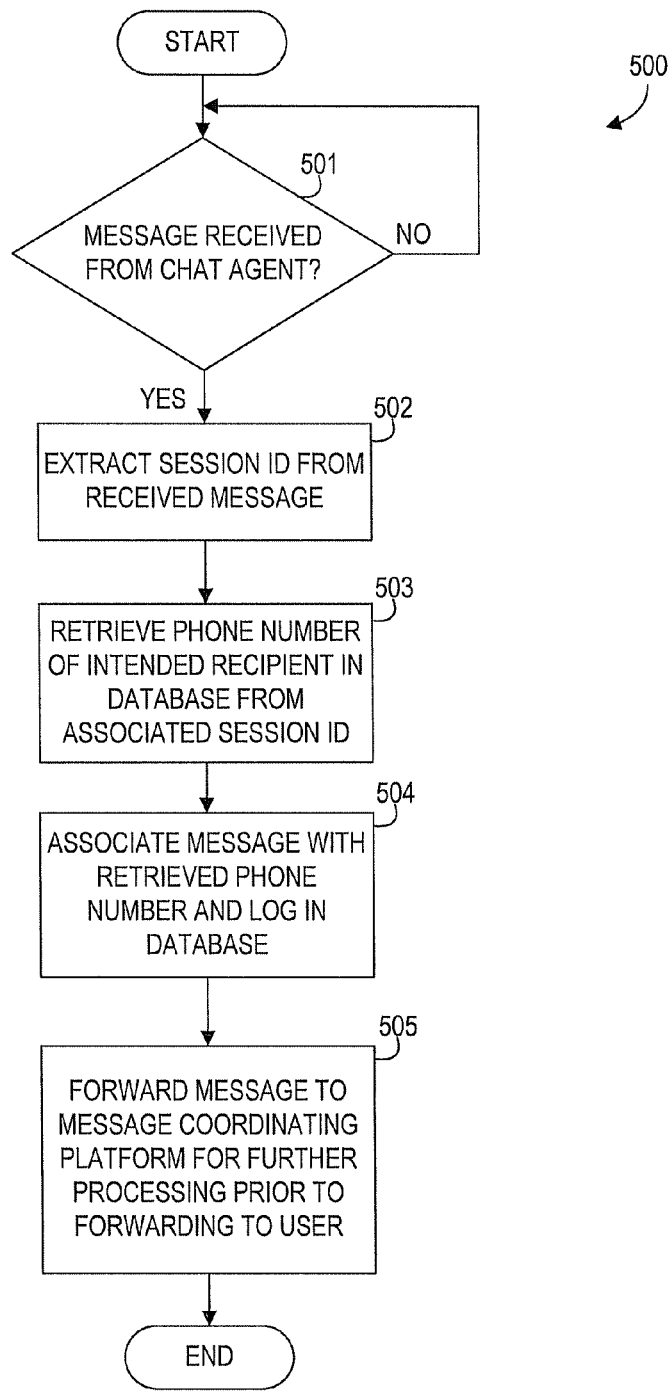
FIG. 5 *MESSAGE RECEIPT AND INTAKE PROCESS AT MMP (AGENT INITIATED)*

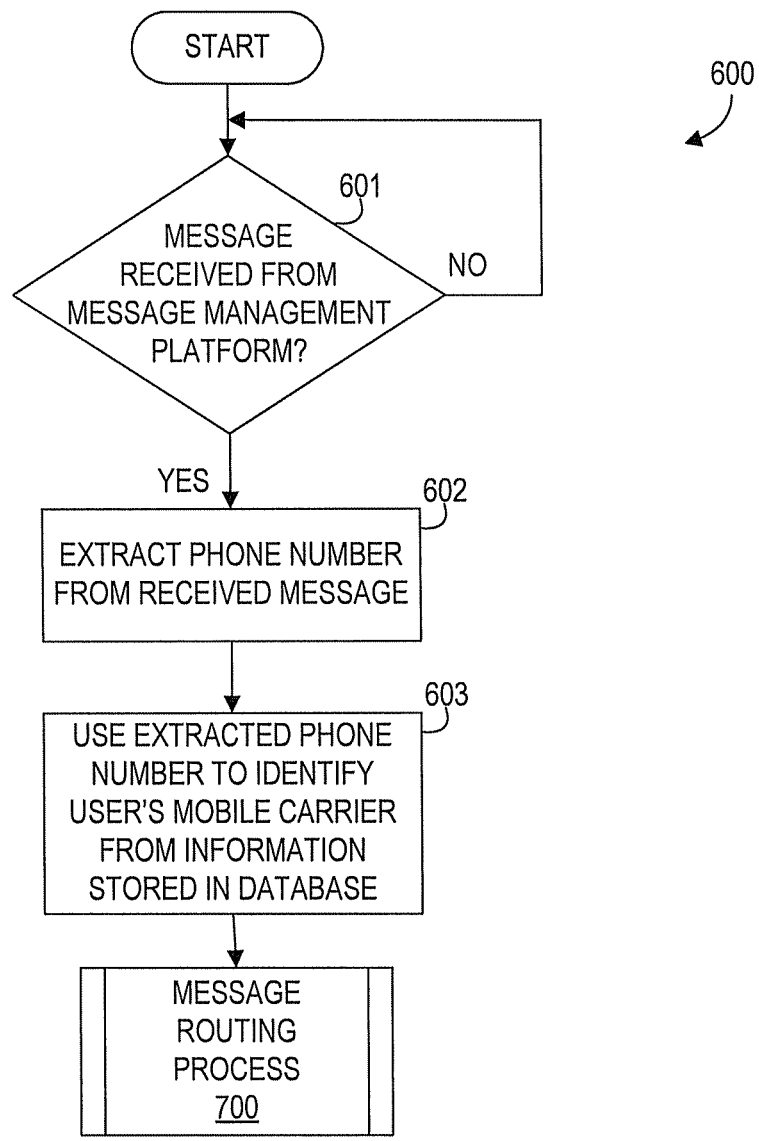
FIG. 6 CARRIER IDENTIFICATION AND PRE-ROUTING PROCESS

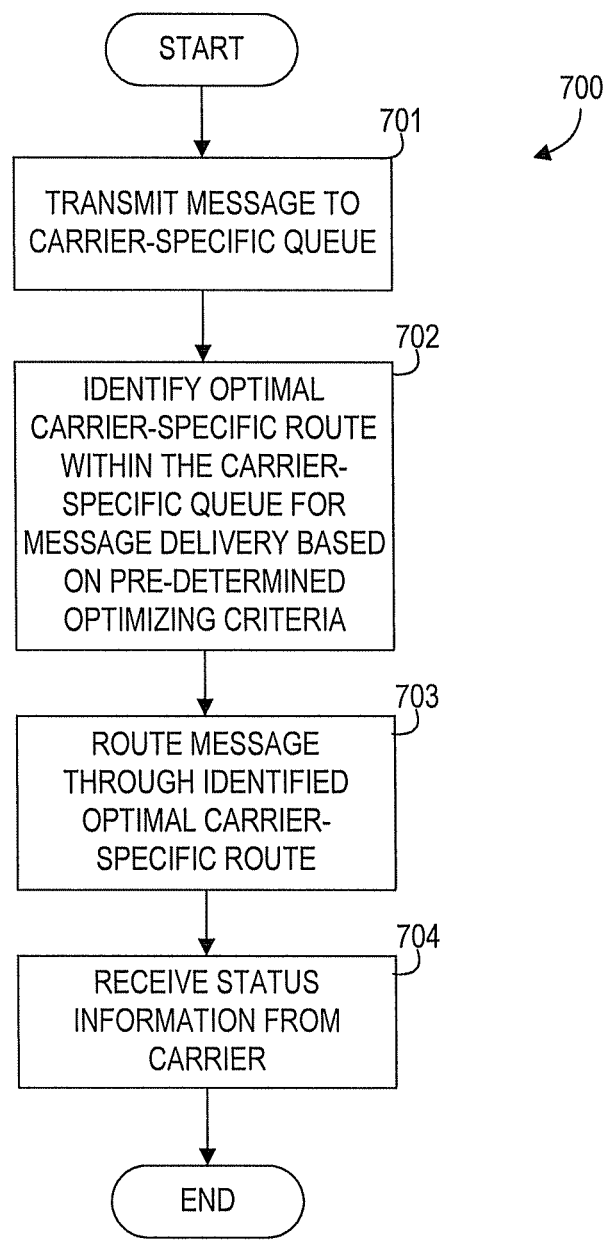
FIG. 7 *MESSAGE ROUTING PROCESS*

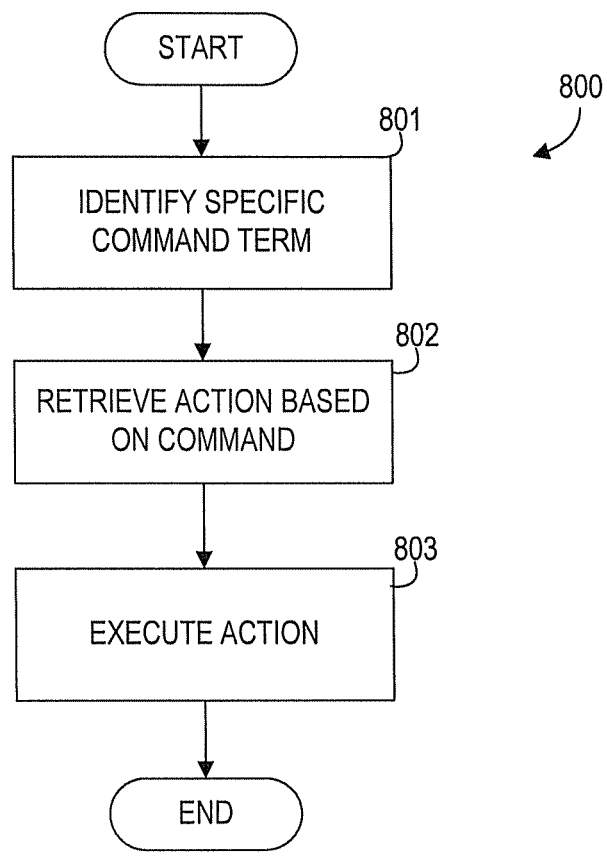
FIG. 8 COMMAND IDENTIFICATION AND EXECUTION PROCESS

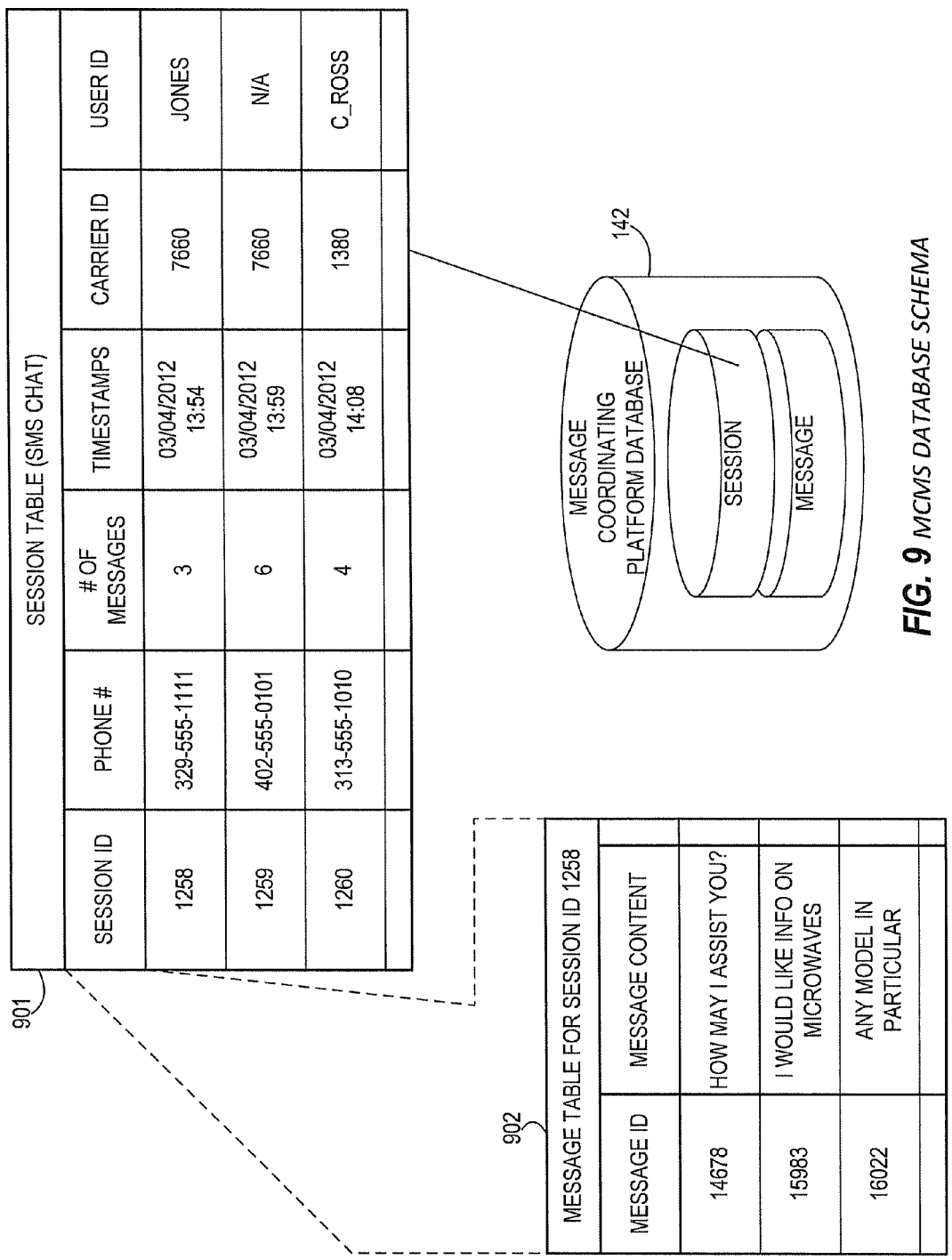
FIG. 9 MCMS DATABASE SCHEMA

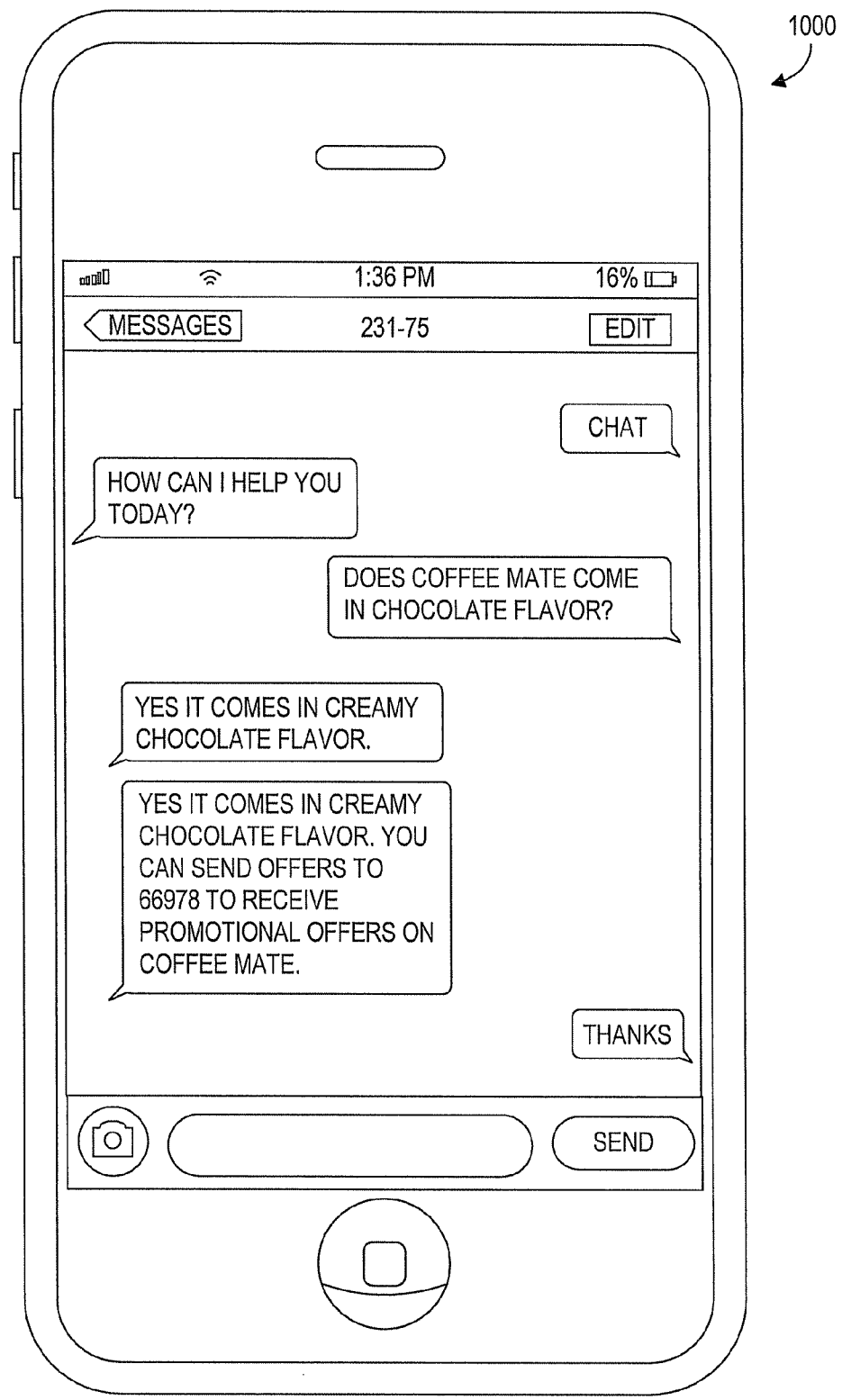
FIG. 10 EXEMPLARY MOBILE DEVICE USER INTERFACE

FIG. 11 EXEMPLARY CHAT AGENT MCMS CHAT CONSOLE

SYSTEMS AND METHODS FOR PERFORMING LIVE CHAT FUNCTIONALITY VIA A MOBILE DEVICE

CROSS-REFERENCE TO RELATED APPLICATION

This application claims benefit under 35 U.S.C. §119(e) of U.S. Provisional Patent Application No. 61/487,456, filed May 18, 2011, and entitled "Systems and Methods for Performing Live Chat Functionality via a Mobile Device", which is incorporated herein by reference as if set forth herein in its entirety.

TECHNICAL FIELD

The present systems and methods relate generally to computer hardware and software systems for extending the chat capabilities of traditional computer-to-computer chat systems to mobile devices, and more particularly to systems and methods for facilitating chat sessions between customers utilizing mobile devices and customer service representatives using traditional chat platforms.

BACKGROUND

Traditionally, companies such as merchants and online sellers or service providers have used "chat systems" to communicate directly and in real time with a customer or prospective customer ("chat user"). For example, a given chat user may need to speak with a company's customer service representative ("chat agent") regarding a recent purchase of a defective product. The user may log on to the company's website, retrieve the customer service phone number, and call the customer service center. The wait time associated with calling the customer service center is often undesirably long.

As an alternate option in a conventional system, once logging on to the company's website, the user can communicate directly with a customer service representative through a dedicated chat application via the user's computer. Chat systems typically function by enabling users to type and send messages through a chat system to chat agents (i.e., customer service representatives) on the other end of the communication, and vice versa.

Such conventional systems, however, have significant drawbacks. For example, existing chat systems do not integrate with mobile devices (e.g., cellular phones, smartphones, PDAs, etc.) due to the unique limitations and communications interfaces associated with mobile devices. Specifically, most mobile device-based operating systems have limitations in terms of the types of information that can be displayed on a mobile device. Further, many mobile device users do not have web functionality on their mobile device, and thus must use a short messaging system ("SMS") or other such "text" service to chat with others. Historically, these SMS messages have not been compatible with traditional chat systems as the SMS messages can not be properly routed from a mobile carrier network to a traditional chat platform, and vice versa. Further, the format of traditional SMS messages has not been compatible with legacy chat platforms. Therefore, mobile device users generally have not been able to chat directly via their mobile device with chat agents.

Therefore, there is a long-felt but unresolved need for a chat system that enables a user without access to a traditional desktop or laptop computing device to participate in a chat session and communicate with a chat agent as though the chat session had been initiated on a website through a traditional chat system. Likewise, there is a need for a chat system that allows users to participate in chat sessions while they are "on the go," e.g., while shopping at a particular establishment. Further, there is a need for a chat system that can effectively route chat messages from a chat application to a user's mobile device, and vice versa.

BRIEF SUMMARY OF THE DISCLOSURE

Briefly described, and according to one embodiment, aspects of the present disclosure generally relate to systems and methods for extending the chat capabilities of traditional computer-to-computer chat systems to mobile devices, thus allowing mobile device users to participate in chat sessions.

According to one aspect, a Mobile Consumer Messaging System ("MCMS") allows a mobile device user to initiate and conduct a chat session with a chat agent or other customer service representative. As will be generally understood, chat sessions typically allow users and chat agents to type and send/receive messages through a chat system. According to one aspect, such a mobile consumer messaging system utilizes existing mobile communication channels to interface with existing traditional chat systems. Specifically, in various embodiments of the MCMS, chat agents using existing, traditional chat systems are able to participate in chat sessions with end users through the users' mobile devices without specific modifications to the existing chat system. Further, according to one embodiment, chat agents utilize a single chat platform to participate in chat sessions with end users through the end users' mobile devices as well as with various other users utilizing a traditional chat system on a computer. According to yet another aspect of the present embodiment, an MCMS allows a customer who is shopping in a busy store, traveling via an airport, or otherwise lacking access to a traditional computer terminal to initiate and participate in a chat session via a mobile device with a customer service chat agent utilizing a traditional chat system.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment in which an embodiment of the disclosed mobile consumer messaging system ("MCMS") is utilized.

FIG. 2 illustrates an exemplary system architecture of an MCMS, according to one embodiment of the present disclosure.

FIG. 3 is a flowchart showing an exemplary computer-implemented message receipt and intake process for user-initiated chat sessions, wherein SMS messages are typically received from a mobile device user (via a mobile carrier) at a message coordinating platform ("MCP") and are prepared for further processing, according to one embodiment of the present system.

FIG. 4 (including FIGS. 4A and 4B) is a flowchart showing an exemplary computer-implemented chat initiation process, wherein an MCP typically processes received messages in order to initiate chat sessions in the message management platform ("MMP"), according to one embodiment of the present system.

FIG. 5 is a flowchart showing an exemplary computer-implemented message receipt and intake process for chat agent-initiated messages, wherein messages are typically received from a chat agent at an MMP and are processed and forwarded to an MCP for further processing, according to one embodiment of the present system.

FIG. 6 is a flowchart showing an exemplary computer-implemented carrier-identification and pre-routing process, wherein messages are received at an MMP and are processed in order to identify an intended user recipient's mobile carrier prior to routing to the intended user recipient, according to one embodiment of the present system.

FIG. 7 is a flowchart showing an exemplary computer-implemented message routing process, wherein messages are processed and routed to intended user recipients through identified carrier-specific routes, according to one embodiment of the present system.

FIG. 8 is a flowchart showing an exemplary command identification and execution process.

FIG. 9 is an exemplary MCMS database schema showing various exemplary data stored in a session table and a message table, according to one exemplary embodiment of the present system.

FIG. 10 is a screenshot of an exemplary MCMS chat user interface (as shown on a mobile device), according to one embodiment of the present system.

FIG. 11 is a screenshot of an exemplary MCMS chat agent interface, according to one embodiment of the present system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present disclosure generally relate to systems and methods for extending the chat capabilities of traditional computer-to-computer chat systems to mobile devices, thus allowing mobile device users to participate in chat sessions.

According to one aspect, a Mobile Consumer Messaging System ("MCMS") allows a mobile device user to initiate and conduct a chat session with a chat agent or other customer service representative. As will be generally understood, chat sessions typically allow users and chat agents to type and send/receive messages through a chat system. According to one aspect, such a mobile consumer messaging system utilizes existing mobile communication channels to interface with existing traditional chat systems. Specifically, in various embodiments of the MCMS, chat agents using existing, traditional chat systems are able to participate in chat sessions with end users through the users' mobile devices without specific modifications to the existing chat system. Further, according to one embodiment, chat agents utilize a single chat platform to participate in chat sessions with end users through the end users' mobile devices as well as with various other users utilizing a traditional chat system on a computer. According to yet another aspect of the present embodiment, an MCMS allows a customer who is shopping in a busy store and lacks access to a traditional computer terminal to initiate and participate in a chat session via a mobile device with a customer service chat agent.

Exemplary Embodiment

Referring now to the figures, FIG. 1 illustrates an overview 100 of an embodiment of a Mobile Consumer Messaging System ("MCMS") 101 in an exemplary environment, constructed and operated in accordance with various aspects of the present disclosure. As shown in FIG. 1, the MCMS 101 comprises a Message Coordinating Platform ("MCP") 140 for carrying out various computer-implemented processes of the MCMS 101. The MCMS 101 likewise includes a Message Management Platform ("MMP") 160 for carrying out various other computer-implemented processes of the MCMS 101. Embodiments of the MCMS 101 further include various databases for storing system data, such as databases 142 and 162. (Architectural details showing various software modules, engines, and databases comprising an embodiment of the MCMS 101 will be described in greater detail in connection with FIG. 2.)

As discussed and according to the embodiment shown in FIG. 1, an MCMS 101 comprises an MCP 140 and an MMP 160, which are operatively connected through a network 150, such as the Internet. Typically, such operative connections involve a secure connection or communications protocol, and communications over a network 150 typically involve the use of one or more services such as a Web-deployed service with client/server architecture, a corporate Local Area Network ("LAN") or Wide Area Network ("WAN"), or through a cloud-based system. According to a further embodiment not shown in FIG. 1 and as will be understood by one skilled in the art, an MCP 140 and an MMP 160 may comprise a unitary system, or the functionalities can be carried out by a consolidated system, and it is unnecessary for these systems to be separate and discrete.

The MCMS 101 includes operative (and preferably wireless) connections to potential customers and various other users via a carrier network 120A or 120B. Although FIG. 1 only shows two carrier networks, it will be understood and appreciated by a person of ordinary skill in the art that multiple networks may be connected to an MCMS 101. According to one aspect, these networks are provided by any one of the commonly available cellular network providers (e.g., SPRINT™, AT&T™, VERIZON WIRELESS™, T-MOBILE™, etc.). Generally, operative connections between an MCMS and a user involve a secure connection or communications protocol, such as Hypertext Transfer Protocol/Secure ("HTTPS"). Furthermore, communications over a cellular network, which is utilized according to one aspect of the present embodiment, typically involve the usage of one or more services such as Short Message Service ("SMS"), BlackBerry Messenger ("BBM"), Multimedia Messaging Service ("MMS"), or other similar services. Moreover, various networking components such as routers, switches, hubs etc., are typically involved in such communications, and although not shown in FIG. 1, certain embodiments of the present disclosure may include one or more secure networks, gateways/firewalls that provide information security from unwarranted intrusions and cyber attacks.

According to the embodiment shown in FIG. 1, the MCMS 101 is in operative communication with one or more mobile device users 110A, 110B, and 110C through carrier networks 120A and 120B. According to one aspect, a mobile device user 110A initiates a chat session with, for example, a customer service representative, by sending a chat message 115 through the mobile device user's mobile carrier network 120A to a predefined chat address (described in greater detail below). Further, as used herein, the term "chat message" generally refers to an SMS message, BBM message, MMS message, or other similar message type.

For example, a mobile device user shopping in a department store may have a question regarding a particular item for sale in the store. If the department store offers customers the opportunity to conduct mobile chats with customer service representatives, it may have signs posted throughout the store that provide customers with a specified address or number for connecting to customer service representatives via mobile device. Such specified addresses or numbers allow the carrier network to recognize that the user is requesting a chat session with a customer service representative and the message should be handled accordingly, as will be discussed in greater detail below. Customers are able to send a keyword such as "CHAT" or a general question to the specified address or number which will in turn initiate the a chat session with a customer service representative through an embodiment of the MCMS. Specifically, by sending a chat message with appropriate identifying information to a predetermined number (e.g., phone number, address, etc.), the mobile carrier and MCMS are able to determine that the message should be routed to the MCMS (and, a corresponding MMP 160 of the department store) for further processing.

After receiving and processing the mobile device user's chat message 115, according to one aspect, the mobile device user's mobile carrier typically forwards the chat message to an MCP 140 of an MCMS 101 for processing before sending the message to an MMP 160 (e.g., chat platform). Generally, once the MCP 140 receives the mobile device user's chat message, Message Coordinating Module 144 processes the chat message to extract certain information included in said message. Such information may include, but is not limited to, the particular area of skill or knowledge requested from a chat operator, a request for a chat operator who speaks a particular language, a request for a chat operator in a particular geographic location, etc. (Further details regarding the various processes carried out by an MCP 140 will be described in greater detail in connection with FIGS. 2, 3, 4A, 4B, 6, and 7.) In addition, according to one embodiment, the MCP 140 converts the chat message from its current format, which may comprise SMS, BBM, MMS, or other similar format as will be understood by one skilled in the art, into a format compatible with traditional chat platforms.

Typically, once the Messaging Coordinating Module 144 fully processes the mobile device user's chat message, the MCP 140 forwards the transformed chat message to an MMP 160 for further message processing, such as determining a proper customer service representative console to which said message should be forwarded. (Details regarding the various processes carried out by an MMP 160 will be described in greater detail in connection with FIGS. 2 and 5.)

Figure 11:
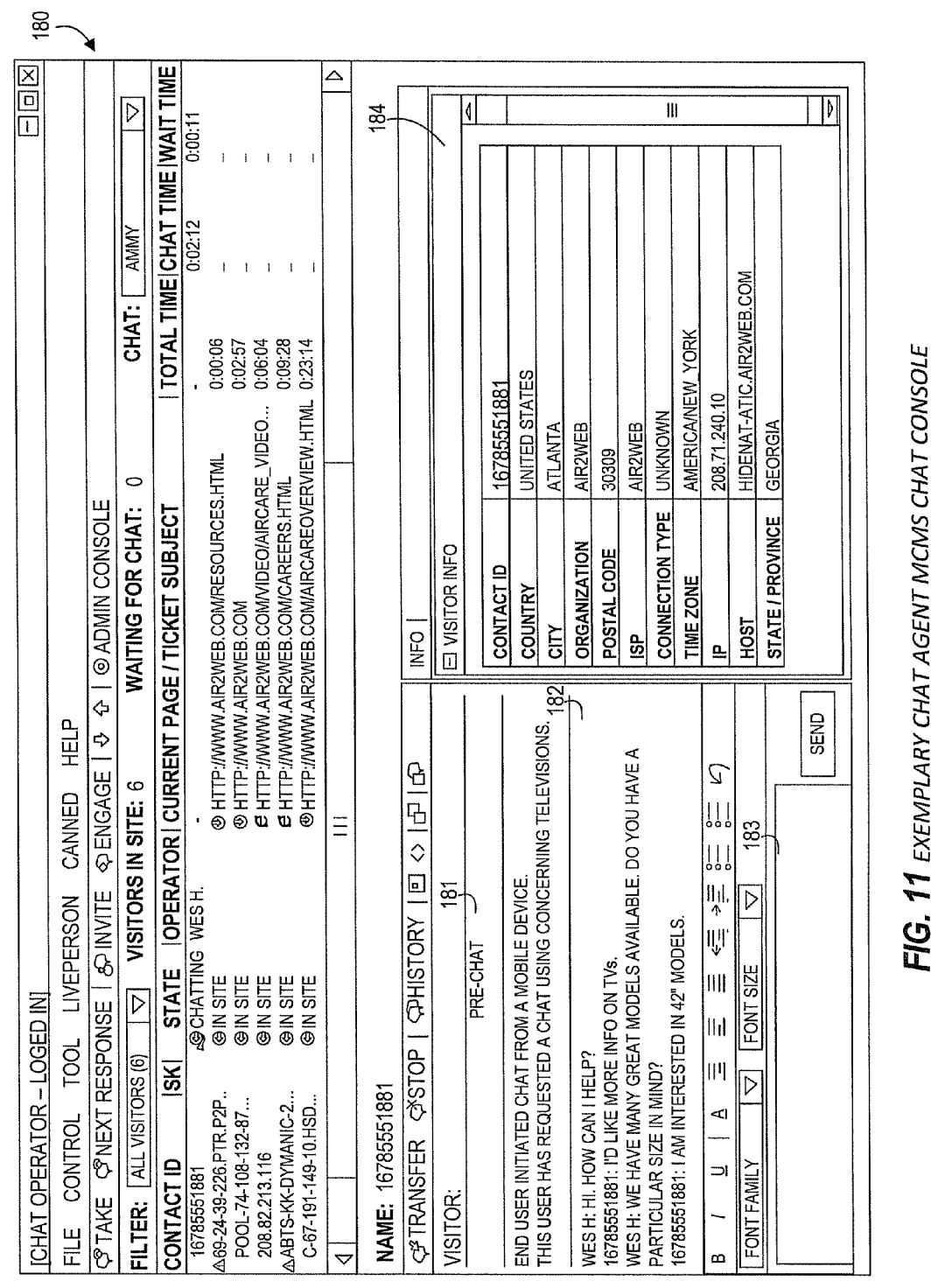

According to one aspect, after an MMP 160 further processes a mobile device user's chat message, the MCMS 101 typically routes said message to one or more chat consoles 180 operating on one or more customer service representatives' 170A, 170B, and 170C electronic computing devices (e.g., laptop computers, desktop computers, etc.). According to the embodiment shown in FIG. 1, customer service representatives' electronic computing devices are operatively connected to an MCMS 101 through a network 150, such as the Internet. As discussed previously, such operative connections generally involve a secure connection or communications protocol, and communications over a network 150 typically involve the use of one or more services such as a Web-deployed service with client/server architecture, a corporate Local Area Network ("LAN") or Wide Area Network ("WAN"), or through a cloud-based system. According to one aspect, once a chat console 180 operating on a customer service representatives' 170A, 170B, and 170C electronic computing device receives a mobile device user's transformed chat message 125, a customer service representative (chat agent) is generally able to view the content of the mobile device user's chat message. According to one aspect, a chat console displays one or more messages from one or more mobile device users, in addition to various other information that may include a mobile device user's name, geographic location, chat history, phone number, historical information relating to a mobile device user, or other similar information. (An exemplary embodiment of a chat console 180 will be discussed further in relation to FIG. 11).

Still referring to FIG. 1, upon receipt of a mobile device user's chat message 125 at a chat console 180, a customer service representative 170A, 170B, and 170C, typically sends a responsive introductory message to said mobile device user 110. Generally, an MCMS 101 receives a customer service representative's responsive introductory message for processing by an MMP 160 as will be further discussed in connection with FIG. 5. Subsequent to said processing by an MMP 160, the customer service representative's responsive introductory message is typically routed to an MCP 140 for further processing as will be discussed in detail in connection with FIG. 6. According to one aspect, an MCP 140 typically identifies the mobile carrier associated with the intended recipient mobile user of said message and prepares the message for routing to the intended recipient's mobile device as will be discussed in detail in connection with FIG. 7. Further, an MCP 140 generally converts said responsive introductory message into an SMS message, BBM message, MMS message, or other similar message type, as is necessary for receipt and viewing on a mobile device.

According to one embodiment, following said MCP 140 processing, an MCMS 101 typically routes said message to said identified mobile carrier for delivery to the intended recipient's mobile device by the mobile carrier. In one embodiment (described in greater detail below), the message is optimally routed to the user 100 through a carrier routing path to optimize delivery time and load balancing based on various factors including network traffic, route availability, etc. In general and according to one embodiment, upon receipt of the responsive introductory message from a customer service representative, a mobile user utilizing a mobile device is able to conduct an ongoing chat session with a customer service representative in the manner described herein.

According to one aspect of the present embodiment, a mobile device user 110A, 110B, and 110C may likewise use a mobile website optimized for a mobile device or a mobile application to initiate a chat session. In such an embodiment, chat messages are provided to the MCMS 101 over a mobile network via a mobile web application or simply via a mobile network (as opposed to SMS, MMS, or other similar short messaging format).

The discussions above in association with FIG. 1 are merely intended to provide an overview of an embodiment of the present system for extending the chat capabilities of traditional computer-to-computer chat systems to mobile devices, thus allowing mobile device users to participate in chat sessions. Accordingly, it will be understood that the descriptions in this disclosure are not intended to limit in any way the scope of the present disclosure. Various architectural details of an embodiment of the disclosed MCMS will be described next in greater detail.

FIG. 2 illustrates an exemplary system architecture 200 of an MCMS 101 according to one embodiment of the present disclosure. According to one aspect, an MCMS 101 is hosted on a third party physical server or a cloud server. As shown and discussed previously, an MCMS 101 comprises a Message Coordinating Platform ("MCP") 140 and a Message Management Platform ("MMP") 160. According to one embodiment, both the MCP 140 and MMP 160 are servers or collections of software modules comprising databases and various software relating to a plurality of software modules, processes, sub-routines, or various algorithms operated by an embodiment of the MCMS 101.

In the specific embodiment shown in FIG. 2, the MCP 140 includes Message Coordinating Module 144. According to one aspect, a Message Coordinating Module 144 comprises the following: Message Receipt and Intake Module 350, for processing chat messages received from mobile carriers; Chat Initiation Module 450, for further processing messages received from mobile carriers and initiating chat sessions with customer service representatives; Carrier-Identification and Pre-Routing Module 650, for processing chat messages prior to forwarding to mobile carriers for delivery to mobile device users; and, Message Routing Module 750, for routing chat messages to carrier-specific queues and optimized delivery routes within said queues. According to one aspect, Message Coordinating Module 144, and the various modules and processes that make up Module 144, are operatively connected to a Message Coordinating Platform Database 142 for storing various types of data utilized by the MCP 140.

Likewise, according to the specific embodiment shown in FIG. 2, the MMP 160 includes a Message Management Module 164, which comprises a Message Receipt and Intake Module 550. According to one aspect, a Message Receipt and Intake Module 550 processes chat messages received from chat agents prior to forwarding said messages to a MCP 140. Further, according to one aspect, a Message Management Module 164, and the various modules and processes that make up Module 164, are connected to a Message Management Platform Database 142 for storing various types of data utilized by the MMP 160.

As will be understood by one skilled in the art, the architecture as well as the specific modules and databases in FIG. 2 are shown for illustrative purposes only, and embodiments of the present system are not limited to the specific architecture shown, as an MCMS 101 may comprise any combination of modules, components, and databases necessary to perform the functions described herein. The functions and operations of these exemplary modules and system components are described in greater detail below with respect to the various flowcharts and figures displayed in FIGS. 3-8. Additionally, as previously discussed and as will be understood by one skilled in the art, an MCP 140 and an MMP 160 may comprise a unitary system, or the functionalities can be carried out by a consolidated system, and it is unnecessary for these systems to be separate and discrete. As will further be understood by one skilled in the art, though not shown in FIG. 1 or 2, an MMP 160 may be externally operated by an independent third party, in which case said MMP 160 would not be physically connected to an MCMS 101 and would instead be operatively connected through a network 120 or 150, as will be understood by one of ordinary skill in the art. For example, the MMP 160 may comprise an existing chat platform at a facility operated by a retailer (i.e., a legacy chat platform being operated by chat agents in a customer service call center). Further, as shown in FIG. 2 and discussed previously, a MCMS 101 generally includes operative connections via networks 120 and 150 for facilitating chat sessions between mobile device users and chat agents. In the discussion that follows, a high-level overview of various exemplary MCMS processes will be described.

FIG. 3 illustrates an exemplary Message Receipt and Intake Process 300 that is performed by various modules and software components associated with an embodiment of an MCP 140 for purposes of receiving and performing an intake process on chat messages from mobile provider networks 120, such chat messages originating from mobile device users 110. As shown, the Message Receipt and Intake Process 300 may further call two subroutines: a Chat Initiation Process 400 and a Command Identification and Execution Process 800. Further details of these processes are explained in FIGS. 4A, 4B, and 8. As will be understood, the steps of the process 300 shown in FIG. 3 are not necessarily completed in the order shown, and various processes of an MCMS 101 may operate concurrently and continuously. Accordingly, the steps shown in FIG. 3 are generally asynchronous and independent, computer-implemented, tied to particular machines, and not necessarily performed in the order shown.

Starting at step 301, an MCP 140 verifies whether or not the MCMS 101 has received from a mobile carrier a chat message generated by a mobile device user. If the MCP 140 determines that no chat message has been received, the MCP 140 continues checking for received messages. If the MCP 140 determines a chat message has been received, however, the process 300 continues to step 302. At step 302, the MCP 140 assigns certain unique identifying information to the received chat message. According to one embodiment and as shown in FIG. 3, identifying information can include a unique message ID, a time stamp, an ID to identify the carrier from whom the chat message was received, etc. As will be understood, chat message identifying information is not limited to the examples listed above and can include various other identifying information as will occur to one skilled in the art. Subsequent to assigning the various chat identification information to the message, the MCP 140 generally stores said chat identifying information relating to the received message in the MCP Database 142.

Next, at optional step 303 and according to certain embodiments, an MCP 140 processes and reassembles the received message if the message is longer than a predetermined number of characters. Certain messaging services limit the length of transmittable messages to a predetermined number of characters wherein a character includes a letter, number, punctuation mark, or blank space. For example, SMS messages are limited to 160 characters. According to one embodiment, if a mobile device user's chat message exceeds the predetermined character limit as set by the messaging service, and said chat message is subsequently subdivided into multiple messages to comply with said character limits, the MCP 140 will reassemble the multiple messages into a single chat message as intended by the mobile device user.

Moving to step 304, according to one embodiment, an MCP 140 extracts from the received chat message the phone number of the mobile device from which the received chat message originated. Once the MCP 140 extracts the phone number associated with the received message, the MCP 140 typically verifies whether or not said extracted phone number is associated with an active chat, as shown in step 305. According to one embodiment and as used herein, an "active chat" is characterized as an ongoing chat session between a mobile device user and a chat agent subsequent to an MCP 140 performing a Chat Initiation Process 400, as will be described in more detail in relation to FIGS. 4A and 4B. Should the MCP 140 determine at step 305 that the phone number from the mobile device from which the received chat message originated is not associated with an active chat, the MCP 140 generally initiates the Chat Initiation Process 400, as will be described below. If the phone number is associated with an active chat, however, the MCP 140 initiates step 306.

Still referring to FIG. 3, after determining that the extracted phone number is associated with an active chat, according to step 306, an MCP 140 typically retrieves from an MCP Database 142 a pre-assigned chat session ID associated with the extracted phone number. According to one aspect, a chat session ID is unique identifier comprising a predetermined number of characters used by the MCMS 101 to identify a particular chat session between a mobile device user and a chat agent. As will be understood by one skilled in the art, a chat session ID may comprise a random series of letters or numbers, a random combination of letters and numbers, or a random combination of various other characters as can be imagined, that uniquely identify a particular chat session. The process of assigning a chat session ID to a chat session is described more fully in relation to FIG. 4B, step 411. Generally, after retrieving the pre-assigned chat session ID associated with the extracted phone number, the MCP 140 associates said chat session ID to the received chat message.

Upon associating a chat session ID to the received chat message, the MCP 140 typically verifies whether or not the received chat message contains a command corresponding to a specific action, as shown at step 307. According to one embodiment, a command for a specific action may comprise a predefined word, phrase, or other string of characters associated with a specific action to be carried out by the MCMS 101. For example, a received chat message could consist of the word "STOP", which according to one embodiment would indicate that the mobile device user no longer wished to carry on a chat session and would trigger the MCMS 101 to immediately terminate said chat session. As will be understood by one skilled in the art, this is merely one example of a potential command for a specific action, and any number of such commands can be imagined. Should the MCP 140 determine at step 307 that a chat message does contain a command for a specific action, the MCP 140 generally initiates the Command Identification and Execution Process 800, as will be discussed further in relation to FIG. 8.

If the MCP 140 determines that a chat message does not contain a command for a specific action, according to one embodiment, the MCP 140 filters the received chat message for obscene content as shown in optional step 308. Although not shown in FIG. 3, it generally will be understood that at a prior instance of time, content filters are configured to screen messages for obscenities or other potentially offensive information, according to certain predetermined criteria. As will be further understood, filters are not limited to screening messages for obscenities or offensive information, and can be configured to screen messages for any information deemed relevant. According to one embodiment, upon detection of obscenities in a received chat message, the MCP 140 will, for example, remove the obscenities from the message or replace the characters comprising the obscenity with arbitrary characters or punctuation marks. According to one further aspect, upon detecting an obscenity or other offensive information in a received message, the MCP 140 will send a message, for example, serving as a warning that further messages containing obscenities or offensive content will result in termination of the chat session, directed to the mobile device user who sent the received chat message. As will be understood, these are merely examples of options for addressing obscenities or offensive information in a received message, and many other options will occur to one of ordinary skill in the art.

At step 309, the MCP 140 typically transmits the received chat message to an MMP 160 for further processing, and the Message Receipt and Intake Process 300 ends. Although not shown in FIG. 3, it will be understood that in many MCMS 101 embodiments, one or more steps of various above-mentioned processes, e.g., the Chat Initiation Process 400 and the Command Identification and Execution Process 800, may be combined to operate in tandem, as will occur to one skilled in the art.

FIGS. 4A and 4B combine to illustrate an exemplary Chat Initiation Process 400 showing computer-implemented method steps involved in initiating a chat session upon receipt of a chat message from a mobile device user 110 seeking to begin a chat session with a chat agent (e.g., customer service representative) 170. Starting at step 401, the MCP 140 extracts content from a chat message for determining the particular area of knowledge or skill required from chat agent. For example, a customer shopping in an electronics store may have a question relating to a specific television. In such an instance, the customer may send to an appropriate predefined chat address a chat message that reads, "I have a question about a television." According to one embodiment, the MCP 140 will extract information from this received chat message to determine the area of expertise required from the customer service representative. As will be understood, any information in a mobile device user's chat message can be used in an effort to make such a determination, and the above example is merely intended for illustrative purposes.

Generally, once the MCP 140 extracts the message content from the chat message, the MCP 140 compares the extracted content to a predefined list of identifying terms stored in an MCP Database 142, as shown at optional step 402. Referring back to the present illustrative and non-limiting example, the MCP 140 extracts "television" from the received message and compares the term to a predefined list of terms corresponding to various chat agent areas of knowledge or skill.

Moving to optional step 403, the MCP 140 determines whether a match exists between the extracted content of the received message and the predefined list of identifiers in the MCP Database 142. According to one aspect, and referring again to the present example, if no match exists, i.e., "television" does not correspond to the predefined list of identifiers, the Chat Initiation Process 400 proceeds to step 404 and transmits to the mobile device user (via the respective carrier network 120) an error message, a message requesting further information, a message containing other options from which the user can select, or other such messages as will occur to one of ordinary skill in the art. According to one aspect, the MCMS 101 may transmit a message indicating that the user's request is not understood or that the system does not recognize such a request. According to another aspect, the MCMS 101 may transmit a message requesting that the user select from a list of knowledge or skill options (of the chat agent or representative). In the present example, such a list may include options such as appliances, electronics, software, or various others as will be understood by one skilled in the art. After transmitting such a message according to step 404, the Chat Initiation Process 400 ends.

If, however, a match does exist between the extracted chat message content and the predefined list of identifiers in the MCP Database 142, the Chat Initiation Process 400 proceeds to step 405, and the MCP 140 transmits the message to the MPP 160 requesting a chat session with a chat agent and including an indication of the knowledge or skill required by the mobile device user. In the present example, if a match exists, i.e., "television" corresponds to an identifier in the predetermined list and indicates a particular area of chat agent knowledge or skill, the MCP 140 transmits a message to the MMP 160 requesting a chat session and indicating the mobile device user intends for the chat session to concern televisions. According to one aspect not shown in FIG. 4A, prior to transmitting a message to the MPP 160, the MCMS 101 may convert the message from its current form (e.g., MMS, SMS, BBM, etc.) to a format that is compatible with traditional chat platforms (e.g., mobile status notification protocol (MSNP), rendezvous protocol (RVP), session initiation protocol (SIP), extensible messaging and presence protocol (XMPP), extensible markup language (XML), hyper-text markup language (HTML), etc.), as will be understood by one of ordinary skill in the art. Additionally, such message conversion/transformation may include extracting information from the original chat message and using it to generate the new message (that is in an acceptable format to the MMP 160). Further, as will be understood, such message conversion may occur at various other times during the execution of the processes described herein.

According to certain aspects, once the MCP 140 transmits a message according to step 405, the MCMS 101 may, as shown in step 406, determine whether or not a chat agent who possesses the requisite knowledge or skill is currently present, i.e., is currently accessing a chat console on an electronic computing device in order to conduct chat sessions. If the MCMS 101 determines that a chat agent with the requisite knowledge or skill is not present, according to one aspect, the MCMS 101 generally transmits a message to the mobile device user indicating that chat agents with the requested knowledge or skill are unavailable, as shown in step 407. Referring again to the present example, the MCMS 101 may transmit a message to the mobile device user such as, "None of our television experts are currently available." According to certain additional aspects, subsequent to transmitting an unavailable message as described in relation to step 407, the MCMS 101 may further transmit to a mobile device user a message including additional processing options, as shown in step 408. In the present example, such a message may inquire, "Would you like to chat with one of the agents in another department?". As will be understood, chat messages including additional processing options can take many forms and present many different options to a mobile device user.

Still referring to FIG. 4A, if the MCMS 101 does determine that a chat agent who possesses the requisite knowledge or skill is currently present, according to certain aspects and according to step 409, the MCMS 101 may determine whether said chat agent is presently available, i.e., is not currently conducting an ongoing chat session with another mobile device user or mobile online customer or otherwise engaged or occupied at that moment. If the MCMS 101 determines said chat agent is currently unavailable, according to one aspect, the MCMS 101 may transmit a message asking the mobile device user to momentarily hold or presenting various other options. In the present example, the MCMS 101 may transmit a message to the mobile device user such as, "Please hold. A television expert will be with you momentarily." If, on the other hand, the MCMS 101 determines a chat agent with the requisite knowledge or skill is currently available, the Chat Initiation Process 400 proceeds to the steps illustrated in FIG. 4B.

According to one aspect and per step 411, once an MMP 160 receives a message requesting a chat session from an MCP 140, a chat session is initiated. According to one aspect and as illustrated in FIG. 4B, initiating a chat session typically includes assignment of unique identifying information such as a session ID, timestamp, IP address (of the mobile device user and/or the computing device of the chat agent), etc. In one embodiment, these instances of chat sessions are stored as files within an MCMS database. As will be understood, unique identifying information is not limited to the examples provided and may include other identifiers as will occur to one of ordinary skill in the art.

Typically, after initiating a chat session in the MMP 160, the system establishes the chat session with the mobile device user and transmits a corresponding confirmation message to said user, according to step 412. Additionally, the system establishes a chat session with the specified chat agent and likewise sends a corresponding confirmation message to the chat agent, according to step 413. Though FIG. 4B illustrates steps 412 and 413 as discrete steps, it will be understood by one skilled in the art that these processing steps may also occur in tandem, and no limitation is intended by the embodiment shown in FIG. 4B or any other figure associated with the disclosure.

Generally, once the system establishes the chat session with the mobile device user 110 and the chat agent, the system determines whether a follow-up message has been received from either the mobile device user or the chat agent, according to step 414. According to one aspect, after waiting a pre-specified amount of time and determining that no follow-up message has been received from either party, the Chat Initiation Process 400 ends. If, however, the system receives a follow-up chat message from the mobile device user prior to the expiration of the waiting period, according to one aspect the system initiates the Message Receipt and Intake Process 300, as discussed in relation to FIG. 3, and subsequently ends the Chat Initiation Process 400. If, on the other hand, the system receives a follow-up message from the chat agent, according to one aspect the system initiates the Message Receipt and Intake Process (Agent Initiated) 500, as will be discussed in relation to FIG. 5, and likewise concludes the Chat Initiation Process 400.

FIG. 5 illustrates an exemplary Message Receipt and Intake Process (Agent Initiated) 500 according to one embodiment of the MCMS 101. According to one aspect and as shown in FIG. 5, at step 501, an MMP 160 determines whether a message has been received from a chat agent. If the MMP 160 determines that no such message has been received from a chat agent, the Message Receipt and Intake Process (Agent Initiated) 500 continues to execute step 501, as shown. If, however, the system determines a message has been received at the MMP 160 from a chat agent, the process generally proceeds to step 502.

After receiving a message from a chat agent, the MMP 160 typically extracts the session ID from the received chat message, according to step 502. As discussed previously, a session ID generally is a unique identifier of a chat session between a mobile device user and a chat agent. According to one embodiment, once the MMP 160 extracts the session ID from the chat message, the session ID is used to retrieve the phone number of the intended recipient (mobile device user) as associated to the extracted session ID from an MMP Database 162, according to step 503. After retrieving the phone number of the intended recipient, according to step 504, the MMP typically associates the message received from the chat agent to the phone number of the intended recipient and logs the association of the message and phone number in the MMP Database 162.

Next, the MMP 160 forwards the message received from the chat agent to the MCP 140 for additional processing prior to forwarding the message to the intended recipient, as per step 505. According to one aspect not shown in FIG. 5, prior to forwarding a message to the MCP 140, the MCMS 101 may convert the message from its current form, which is compatible with traditional chat platforms (e.g., MSNP, RVP, SIP, XMPP, XML, HTML, etc.) to a format that is compatible with mobile devices, (e.g., MMS, SMS, BBM, etc.) as will be understood by one of ordinary skill in the art. Further, as will be understood, such message conversion may occur at various other times during the execution of the processes described herein. The Message Receipt and Intake Process (Agent Initiated) 500 ends subsequent to the MMP 160 forwarding the message received from the chat agent to the MCP 140.

FIG. 6 illustrates an exemplary Carrier Identification and Pre-Routing Process 600, according to one embodiment of the present MCMS 101. In one embodiment, this process 600 is performed by modules within an embodiment the MMP 160. As will be understood, this process 600 can be performed by various other modules of an MCMS 101, as will occur to one of ordinary skill in the art. According to one aspect and as shown in FIG. 6, at step 601, an MCP 140 determines whether a chat message has been received from an MMP 160. If the MCP 140 determines that no such message has been received, the Carrier Identification and Pre-Routing Process at MCP 600 continues to execute step 601, as shown. If, however, the system determines a message from a chat agent has been received at the MCP 140, the process generally proceeds to step 602.

Upon determining that a message from a chat agent has been received from an MMP 160, the MCP 140 typically extracts the phone number associated to the received message, per step 602. Generally, mobile providers purchase large blocks of phone numbers, typically in blocks of 1,000 or 10,000, which have been assigned a specific area code and prefix combination. A registrar then declares the purchase in a database release, and as such, telephone numbers can typically be associated to a particular carrier based on the combination of the area code and prefix. Therefore, once the MCP 140 extracts the phone number, according to one aspect, it then uses the phone number to identify the mobile carrier of the intended recipient (mobile device user), according to step 603. According to one aspect not illustrated in FIG. 6, an MCMS 101 initiates a paid query of such a database to determine the carrier associated to a particular phone number. Once an association has been made between a particular phone number and carrier, an MCMS 101 stores that information in an MCP Database 142 for a predetermined amount of time. Therefore, according to the particular circumstance and embodiment, identifying a mobile device user's mobile carrier based on a phone number extracted from a chat message may involve querying a MCP Database 140 for cached carrier information relating to said phone number. Identifying a mobile carrier based on said extracted phone number may likewise involve an MCMS 101 initiating a paid query of a privately maintained database that stores such information.

Once the system identifies the mobile device user's mobile carrier based on the extracted phone number, the system typically proceeds to the Message Routing Process 700 as shown in relation to FIG. 7.

The Message Routing Process 700, as illustrated exemplarily in FIG. 7, typically begins when the system transmits the chat message to a carrier-specific queue. According to one aspect, and not shown in FIG. 7, an MCP 140 may comprise one or more message routing queues for each of the one or more of the commonly available cellular network providers (e.g., SPRINT™, AT&T™, VERIZON WIRELESS™, T-MOBILE™, etc.). As used herein, message routing queues comprise pre-allocated locations where chat messages are temporarily stored prior to their being forwarded to a mobile device user's mobile carrier network 120. According to one further aspect not shown in FIG. 7, such messaging queue may be a Short Message Service Center (SMSC), which stores and delivers messages to mobile device users, as will be understood.

After transmitting a chat message to a particular carrier-specific queue, the system typically identifies an optimized carrier-specific route within a particular carrier-specific queue based on pre-determined optimizing criteria, per step 702. According to one aspect, optimizing criteria can consider network conditions such as the current amount of traffic in a particular route, route availability, load balancing, and various other factors as will occur to one of ordinary skill in the art. Further, according to one aspect and though not shown in FIG. 1, 2, or 7, an MCMS 101 may have actual physical connections to various carrier networks, as will be understood by one skilled in the art.

Once the system identifies an optimized carrier-specific route, the system typically routes the chat message through said route to the mobile device user's carrier network, as per step 703. Once the system routes the chat message to the mobile device user's carrier network, the system generally receives status information from the carrier, as per step 704. According to one aspect, such status information may include a message delivery confirmation, a message indicating the mobile device user's mobile device was inoperative when delivery of the chat message was attempted, or various other status messages as will occur to a person having ordinary skill in the art. As will be understood, steps 703 and 704 are not necessarily completed in the order shown and may occur concurrently and continuously. Generally, upon receiving a status message from the mobile device user's carrier network, the Message Routing Process typically ends, as shown in FIG. 7.

FIG. 8 represents a Command Identification and Execution Process 800 according to one embodiment of the present MCMS 101, as discussed previously in relation to FIG. 3. As discussed, a received chat message could consist of a specific command term (e.g., the word "STOP"), which according to one aspect would indicate that the mobile device user no longer wished to carry on a chat session. Beginning at step 801, once the system determines the chat message contains a command for specific action, per step 307 of the Message Receipt and Intake Process 300, the system typically indentifies the specific command term. Though not shown in FIG. 8, as will be understood by one skilled in the art, identifying a specific command term may involve a comparison between a particular term and a predefined list of commands stored in an MCP Database 142. Once a command term has been identified, the system generally retrieves an action corresponding to the command term. In the example above, upon identifying the command "STOP", the system retrieves a set of instructions to perform one or more actions that, upon execution, immediately terminates the chat session. Moving to step 803, once the system retrieves the requisite instructions, the system typically executes said action.

Now referring to FIG. 9, an exemplary session table 901 (stored in one or more MCP Databases 142) is shown according to one embodiment of the present MCMS 101. As shown, session table 901 comprises various exemplary data columns storing data related to chat sessions between mobile device users and chat agents. As shown in FIG. 9, exemplary session table 901 comprises the following exemplary columns: Session ID, Phone Number, Number of Messages, Time Stamps, Carrier ID, User ID. For example, a session numbered 1258 involves a mobile device user identified by a unique User ID "JONES". Continuing with the example, mobile device user Jones is associated to phone number 329-555-1111 and the mobile carrier associated to Carrier ID 7660. Further, according the example, Jones's chat session includes a total of three messages, the last message having a timestamp of 13:54 on Mar. 4, 2012. Although not shown herein, it will be understood that user-related information (such as User ID and various other user attributes) may be stored in one or more tables stored in one or more MCMS 101 databases. Such tables can be accessed by other tables in MCMS 101 databases (i.e., the tables are typically relational in nature).

Continuing with FIG. 9, an exemplary Message Table 902 relating to Session ID 1258 is shown. As shown, message table 902 comprises columns for Message ID and Message Content. As will be understood, in one aspect, data stored in Message Table 902 relates to the messages and Message IDs comprising a particular chat session (as designated by a particular Session ID). For example, as shown in FIG. 9, user Jones conducted a chat session seeking information regarding microwaves. Each message comprising the chat session was assigned a unique Message ID, but each message was likewise part of the same chat session, in this case, the chat session associated to Session ID 1258.

Furthermore, as will be understood by one of ordinary skill in the art, data tables shown herein, such as session table 901 and message table 902, are presented for illustrative purposes only, and embodiments of the present system are not limited to data, information, and fields in the specific data tables shown. Additionally, the MCMS 101, in alternate embodiments can comprise various other data tables (and databases), as will occur to one skilled in the art.

FIG. 10 illustrates an exemplary screenshot 1000 of mobile device user interface for conducting chat sessions for a mobile device user according to one embodiment of the present MCMS 101. In one embodiment, and as shown in FIG. 10, the mobile device provides touch screen interface functionality for sending and receiving chat messages. According to certain aspects not shown in FIG. 10, a touch screen interface includes a touch screen keyboard for a mobile device user to enter messages to be sent to a chat agent. After preparing a chat message, a mobile device user can then send the message by touching the "Send" key. Alternately, a mobile device user can choose to view other messages or chat sessions by selecting the "Messages" key.

Similarly, FIG. 11 illustrates an exemplary screenshot of a chat agent's (customer service representative's) chat console 180 for interfacing with an MCMS 101. According to one embodiment and as previously discussed, a chat console 180 operates on a chat agent's electronic computing device and typically allows the agent to view the content of one or more mobile device users' chat messages. According to one aspect, a chat agent's chat console 180 can be configured to display various information according to the needs of the particular user. As discussed previously, according to one aspect, a chat console may also display various other information including one or more mobile device users' names, geographic locations, chat histories, phone numbers, or historical information relating to one or more mobile device users, or other similar information as will occur to one of ordinary skill in the art.

As shown in FIG. 11, according to one aspect, a chat console 180 can be configured to display to a chat agent pre-chat information relating to a particular mobile device user. A Pre-Chat region 181, as shown in FIG. 11, displays to a chat agent that the mobile device user initiated the chat session via a mobile device and is interested in discussing televisions. As will be understood, pre-chat information is not limited to such information and may include various other details as will occur to one of ordinary skill in the art.

According to another aspect as also shown in FIG. 11, a chat console 180 can be configured to display to the chat agent a Chat Window 182. A Chat Window 182 generally displays to a chat agent one or more chat messages comprising a chat session as well as identifying information relating to the mobile device user and chat agent. According to one aspect shown in FIG. 11, a customer service representative (chat agent) is identified by a first name and last initial, i.e., "WES H", and a mobile device user is identified by a 11-digit phone number. These examples are merely illustrative and are not intended to be limiting in any way as identifying information can take various forms including, but not limited to, a name, customer ID, phone number, etc. The Chat Window 182 shown in FIG. 11 also displays four chat messages between a mobile device user and a chat agent concerning a mobile device user's interest in televisions. As will be understood, a Chat Window 182 can be configured to display more or less messages depending on the needs of the user.

FIG. 11 also displays a Chat Message Entry Window 183, which, according to one aspect, provides a chat agent a region for entering chat messages to be sent to mobile device users. Further, according to one aspect and as displayed, a Chat Message Entry Window 183 may include various editing tools, such as an option for modifying chat message font or size. As will be understood, editing tools are not limited to the options shown in FIG. 11, and may include various other options as will occur to one of ordinary skill in the art.

According to one embodiment and as also displayed in FIG. 11, a chat console 180 may include a Visitor Information Window 184 for providing a chat agent background information relating to a mobile device user. According to the current example and as shown in FIG. 11, such additional information may include information such as a contact ID, country, city state/province, postal code, etc. Such information typically serves to provide a chat agent with further background information regarding a mobile device user such that the chat agent may more adequately provide assistance. Though not shown in FIG. 11, it will be understood that such visitor information for providing further background information may come from one or more sources, e.g., from the actual user as a part of a chat message, from cached information stored in an MCMS database from a previous chat session involving the same user, from private databases queried by an MCMS 101, from public data sources, etc., as will occur to one of ordinary skill in the art.

As will be understood, the exemplary screenshots in connection with FIGS. 10-11 are for illustrative purposes only, and are not intended to limit the scope of the present disclosure in any way. Further, there can be alternate ways in which the interface can be designed with different buttons, menu bars, tabs and other interface features.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

What is claimed is:

1. In a mobile consumer messaging system (MCMS), in which the MCMS is in electronic communications with a plurality of mobile device users via one or more mobile carrier networks and is in electronic communications with one or more chat agents utilizing one or more chat platforms, a method for facilitating messages between the plurality of mobile devices users and the one or more chat agents, comprising the steps of:
 receiving a particular chat message at the MCMS from a specific mobile device user via a respective mobile carrier network, wherein the particular chat message includes message content and message identifying information;
 extracting via the MCMS the message content and message identifying information from the particular chat message and storing the message content and message identifying information in an MCMS database;
 generating via the MCMS a new message in a format acceptable to a respective chat platform, wherein the new message includes the message content and is based on the message identifying information; and
 transmitting the new message from the MCMS to a respective chat agent associated with the respective chat platform.

2. The method of claim 1, further comprising the step of generating a particular chat session associated with the particular chat message, wherein the particular chat session includes session identifying information stored in the MCMS database and used to identify the particular chat session.

3. The method of claim 1, further comprising the steps of:
 receiving a responsive message at the MCMS from the respective chat agent utilizing the respective chat platform, wherein the responsive message includes responsive message content and responsive message identifying information, and wherein the responsive message is in the format acceptable to the respective chat platform;
 parsing the responsive message via the MCMS to extract a particular chat session identifier from the responsive message identifying information;
 using the particular chat session identifier, retrieving information associated with the particular chat session;
 retrieving a unique identifier of the specific mobile device user to which the responsive message is directed from the particular chat session information;
 associating the responsive message with the unique identifier of the specific mobile device user via the MCMS;
 generating via the MCMS a responsive mobile chat message in a format acceptable to a specific mobile device of the specific mobile device user, wherein the responsive mobile chat message includes the responsive message content and is based on the responsive message identifying information; and
 transmitting the responsive mobile chat message from the MCMS to the specific mobile device user via the respective mobile carrier network.

4. The method of claim 3, wherein the unique identifier of the specific mobile device user comprises the specific mobile device user's phone number.

5. The method of claim 3, further comprising the steps of:
 identifying the respective mobile carrier network associated with the specific mobile device user;
 identifying an optimal carrier-specific route for message delivery based on predetermined optimizing criteria; and
 routing the responsive mobile chat message to the specific mobile device user via the optimal carrier-specific route.

6. The method of claim 1, wherein a mobile device used by the specific mobile device user is selected from the group comprising: smartphones, personal digital assistants (PDAs), cellular phones, mobile-web enabled devices.

7. The method of claim 1, further comprising the step of parsing message content to identify a unique chat agent to which the particular chat message should be directed.

8. The method of claim 7, wherein the step of parsing message content to identify a unique chat agent to which the particular chat message should be directed further comprises the steps of:
 extracting one or more keywords from the message content;
 comparing the extracted keywords to a predefined list of keywords, wherein each keyword in the predefined list of keywords is associated with one or more unique chat agents; and
 if a match exists between the extracted one or more keywords and a specific keyword in the predefined list of keywords, transmitting the particular chat message to the specific chat agent associated with the specific keyword.

9. The method of claim 1, further comprising the step of parsing message content to identify a specific chat agent with a particular set of profile information or skills to which the particular chat message should be directed.

10. The method of claim 1, wherein the message content includes user-entered text.

11. The method of claim 1, wherein the message identifying information is selected from the group comprising: mobile device number, mobile device identifier, mobile device user name, carrier network identifier, internet protocol (IP) address of mobile device, date information, time information.

12. The method of claim 1, wherein the MCMS includes a management computer system for performing functions of the MCMS.

13. The method of claim 1, further comprising the step of if one or more predefined commands are identified in message content, determining and performing a specific predetermined action based on the one or more predefined commands.

14. In a mobile consumer messaging system (MCMS), in which the MCMS is in electronic communications with a plurality of mobile device users via one or more mobile carrier networks and is in electronic communications with one or more chat agents utilizing one or more chat platforms, a method for facilitating messages between the plurality of mobile devices users and the one or more chat agents, comprising the steps of:
 receiving a particular chat message at the MCMS from a specific mobile device user via a respective mobile carrier network, wherein the particular chat message includes message content and message identifying information;

extracting via the MCMS the message content and message identifying information from the particular chat message and storing the message content and message identifying information in an MCMS database;

comparing the message identifying information to stored message identifying information in the MCMS database, wherein the stored message identifying information is associated with one or more ongoing chat sessions between mobile device users and chat agents;

if match exists between the message identifying information and the stored message identifying information, retrieving a specific chat session associated with the stored message identifying information and associating the particular chat message with the specific chat session;

generating via the MCMS a new message in a format acceptable to a respective chat platform, wherein the new message includes the message content and is based on the stored message identifying information associated with the specific chat session; and transmitting the new message from the MCMS to a respective chat agent associated with the specific chat session and utilizing a respective chat platform.

15. The method of claim 14, further comprising the steps of:

receiving a responsive message at the MCMS from the respective chat agent utilizing the respective chat platform, wherein the responsive message includes responsive message content and responsive message identifying information, and wherein the responsive message is in the format acceptable to the respective chat platform;

parsing the responsive message via the MCMS to extract a particular chat session identifier from the responsive message identifying information;

using the particular chat session identifier, retrieving information associated with the specific chat session;

retrieving a unique identifier of the specific mobile device user to which the responsive message is directed from the specific chat session information;

associating the responsive message with the unique identifier of the specific mobile device user via the MCMS;

generating via the MCMS a responsive mobile chat message in a format acceptable to a specific mobile device of the specific mobile device user, wherein the responsive mobile chat message includes the responsive message content and is based on the specific chat session information; and transmitting the responsive mobile chat message from the MCMS to the specific mobile device user via the respective mobile carrier network.

16. The method of claim 15, wherein the unique identifier of the specific mobile device user comprises the specific mobile device user's phone number.

17. The method of claim 15, further comprising the steps of:

identifying the respective mobile carrier network associated with the specific mobile device user;

identifying an optimal carrier-specific route for message delivery based on predetermined optimizing criteria; and routing the responsive mobile chat message to the specific mobile device user via the optimal carrier-specific route.

18. The method of claim 14, wherein a mobile device used by the specific mobile device user is selected from the group comprising: smartphones, personal digital assistants (PDAs), cellular phones, mobile-web enabled devices.

19. The method of claim 14, further comprising the step of parsing message content to identify a unique chat agent to which the particular chat message should be directed.

20. The method of claim 19, wherein the step of parsing message content to identify a specialized chat agent to which the particular chat message should be directed further comprises the steps of:

extracting one or more keywords from the message content;

comparing the extracted keywords to a predefined list of keywords, wherein each keyword in the predefined list of keywords is associated with one or more unique chat agents; and if a match exists between the extracted one or more keywords and a specific keyword in the predefined list of keywords, transmitting the particular chat message to the specific chat agent associated with the specific keyword.

21. The method of claim 14, further comprising the step of parsing message content to identify a specific chat agent with a particular set of profile information or skills to which the particular chat message should be directed.

22. The method of claim 14, wherein the message content includes user-entered text.

23. The method of claim 14, wherein the message identifying information is selected from the group comprising: mobile device number, mobile device identifier, mobile device user name, carrier network identifier, internet protocol (IP) address of mobile device, date information, time information.

24. The method of claim 14, wherein the MCMS includes a management computer system for performing functions of the MCMS.

25. The method of claim 14, further comprising the step of if one or more predefined commands are identified in message content, determining and performing a specific predetermined action based on the one or more predefined commands.

* * * * *